(12) United States Patent
Goldberg et al.

(10) Patent No.: US 8,306,284 B2
(45) Date of Patent: Nov. 6, 2012

(54) MANUALLY-ASSISTED AUTOMATED INDEXING OF IMAGES USING FACIAL RECOGNITION

(75) Inventors: David A. Goldberg, Boulder, CO (US); Robert Gray, Niwot, CO (US); Joe Angell, Longmont, CO (US); Jeffrey Rose, Amsterdam (NL)

(73) Assignee: Hysterical Sunset Limited, Grand Cayman (KY)

( * ) Notice: Subject to any disclaimer, the term of this patent is extended or adjusted under 35 U.S.C. 154(b) by 781 days.

(21) Appl. No.: 12/442,361

(22) PCT Filed: Jul. 12, 2006

(86) PCT No.: PCT/US2006/027323
§ 371 (c)(1),
(2), (4) Date: Jul. 17, 2009

(87) PCT Pub. No.: WO2007/011709
PCT Pub. Date: Jan. 25, 2007

(65) Prior Publication Data
US 2012/0008837 A1    Jan. 12, 2012

Related U.S. Application Data

(60) Provisional application No. 60/700,282, filed on Jul. 18, 2005.

(51) Int. Cl.
*G06K 9/00* (2006.01)
(52) U.S. Cl. ...................................................... 382/118
(58) Field of Classification Search .................. 382/100, 382/115–118; 358/77–78, 143; 707/706–707, 707/758, 915, 999.001
See application file for complete search history.

(56) References Cited

U.S. PATENT DOCUMENTS

| | | | |
|---|---|---|---|
| 2,852,407 | A | 9/1958 | Wood, Jr. et al. |
| 2,944,586 | A | 7/1960 | Yanulis |
| 3,281,259 | A | 10/1966 | Lux et al. |
| 3,498,865 | A | 3/1970 | Paquin et al. |

(Continued)

FOREIGN PATENT DOCUMENTS

EP    0644032    3/1995

(Continued)

OTHER PUBLICATIONS

Giergensohn et al. "Leveraging Face Recognition Technology to Find and Organize Photos," Proceedings of the 6th ACM SIGMM international workshop on Multimedia information retrieval MIR 04, Oct. 15, 2004, pp. 99-106.

(Continued)

*Primary Examiner* — Jose Couso
(74) *Attorney, Agent, or Firm* — Sheridan Ross P.C.

(57) ABSTRACT

The present method relates to the manual assistance for the automated indexing (100) of a collection of images using facial recognition. In a first automated indexing step, automated indexing of faces within a collection of images is performed, creating sets of faces each of which comprises faces that are determined by the automated process to be representative of the same person. In a second splitting step (200), sets are displayed to an operator, who determines whether there are false-positive associations within a set. If false-positive associations are found, the faces representing different people are manually split into different sets, hi this way, there will be no false-positive associations within the collection of images, hi a third merging step (300), sets that have some degree of similarity are presented to the operator, who determines whether the two sets comprise representations of the same person. If so, the two sets are manually merged, thereby eliminating false-negative errors. In this way, all of the faces in the image collection can be completely and accurately indexed.

22 Claims, 4 Drawing Sheets

U.S. PATENT DOCUMENTS

| | | | |
|---|---|---|---|
| 3,551,199 | A | 12/1970 | Forster |
| 3,570,748 | A | 3/1971 | Coyle et al. |
| 3,911,173 | A | 10/1975 | Sprague, Jr. |
| 3,924,013 | A | 12/1975 | Kane |
| 3,944,453 | A | 3/1976 | Chudgar et al. |
| 4,082,854 | A | 4/1978 | Yamada et al. |
| 4,097,893 | A | 6/1978 | Camras |
| 4,234,624 | A | 11/1980 | Linderoth et al. |
| 4,390,387 | A | 6/1983 | Mahn |
| 4,484,971 | A | 11/1984 | Wang |
| 4,525,414 | A | 6/1985 | Ohya et al. |
| 4,528,219 | A | 7/1985 | Yamada et al. |
| 4,559,095 | A | 12/1985 | Babbin |
| 4,791,598 | A | 12/1988 | Liou et al. |
| 4,902,378 | A | 2/1990 | Ouderkirk et al. |
| 4,916,532 | A | 4/1990 | Streck et al. |
| 4,936,938 | A | 6/1990 | Simpson et al. |
| 4,941,193 | A | 7/1990 | Barnsley et al. |
| 4,954,393 | A | 9/1990 | Jones |
| 4,991,205 | A | 2/1991 | Lemelson |
| 5,164,992 | A | 11/1992 | Turk et al. |
| 5,213,900 | A | 5/1993 | Friedrich |
| 5,321,396 | A | 6/1994 | Lamming et al. |
| 5,363,504 | A | 11/1994 | Hasuo |
| 5,381,155 | A | 1/1995 | Gerber |
| 5,432,864 | A | 7/1995 | Lu et al. |
| 5,493,677 | A | 2/1996 | Balogh et al. |
| 5,549,943 | A | 8/1996 | Vicik |
| 5,550,928 | A | 8/1996 | Lu et al. |
| 5,554,984 | A | 9/1996 | Shigenaga et al. |
| 5,566,327 | A | 10/1996 | Sehr |
| 5,572,596 | A | 11/1996 | Wildes et al. |
| 5,576,838 | A | 11/1996 | Renie |
| 5,598,208 | A | 1/1997 | McClintock |
| 5,602,375 | A | 2/1997 | Sunahara et al. |
| 5,629,981 | A | 5/1997 | Nerlikar |
| 5,655,053 | A | 8/1997 | Renie |
| 5,666,215 | A | 9/1997 | Fredlund et al. |
| 5,680,223 | A | 10/1997 | Cooper et al. |
| 5,699,449 | A | 12/1997 | Javidi |
| 5,796,428 | A | 8/1998 | Matsumoto et al. |
| 5,802,208 | A | 9/1998 | Podilchuk et al. |
| 5,947,369 | A | 9/1999 | Frommer et al. |
| 6,108,437 | A | 8/2000 | Lin |
| 6,217,695 | B1 | 4/2001 | Goldberg et al. |
| 6,389,181 | B2 | 5/2002 | Shaffer et al. |
| 6,430,307 | B1 | 8/2002 | Souma et al. |
| 6,526,158 | B1 | 2/2003 | Goldberg |
| 6,801,641 | B2 | 10/2004 | Eraslan |
| 6,819,783 | B2 | 11/2004 | Goldberg et al. |
| 7,130,454 | B1 | 10/2006 | Berube et al. |
| 7,274,832 | B2 * | 9/2007 | Nicponski ............... 382/297 |
| 7,277,891 | B2 * | 10/2007 | Howard et al. ............. 707/707 |
| 7,561,723 | B2 * | 7/2009 | Goldberg et al. .......... 382/115 |
| 7,962,467 | B2 * | 6/2011 | Howard et al. ............. 707/706 |
| 2002/0049728 | A1 | 4/2002 | Kaku |
| 2003/0118216 | A1 | 6/2003 | Goldberg |
| 2004/0008872 | A1 | 1/2004 | Goldberg |
| 2005/0100195 | A1 | 5/2005 | Li |
| 2007/0003113 | A1 | 1/2007 | Goldberg |
| 2008/0310688 | A1 | 12/2008 | Goldberg |

FOREIGN PATENT DOCUMENTS

| | | |
|---|---|---|
| EP | 1288798 | 3/2003 |
| JP | 2002/024229 | 4/2002 |
| WO | WO 95/24795 | 9/1995 |
| WO | WO 98/10358 | 3/1998 |
| WO | WO 02/19137 | 3/2002 |
| WO | WO 2004/072897 | 8/2004 |

OTHER PUBLICATIONS

Official Action for European Patent Application No. 06787260, dated Jun. 10, 2011 6 pages.

Das et al., "Automatic face-based image grouping for albuming", Systems, Man and Cybernetics, 2003. IEEE International Conference on; vol. 4, Oct. 5, 2003, pp. 3726-3731.

Longbin Chen et al., "Face annotation for family photo management", International Journal of Image and Graphics, World Scientific Publishing Co., Singapore, SG, vol. 3, No. 1, Dec. 30, 2002, pp. 81-94.

Lei Zhang et al., "Automated annotation of human faces in family albums", Proceedings of the 11th ACM International Conference on Multimedia, Berkley, CA, Nov. 4-6, 2003, vol. Conf. 11, Nov. 2, 2003, pp. 355-358.

Loui et al., "Automated event clustering and quality screening of consumer pictures for digital albuming", IEEE Transactions on Multimedia, IEEE Service Center, Piscataway, NJ, US, vol. 5, No. 3, Sep. 1, 2003, pp. 390-402.

International Search Report for International (PCT) Patent Application No. PCT/US97/15829, mailed Jan. 5, 1998.

International Preliminary Examination Report for International (PCT) Patent Application No. PCT/US97/15829, mailed Nov. 30, 1998.

International Search Report for International (PCT) Patent Application No. PCT/US97/07773, mailed Sep. 11, 1997.

Written Opinion for International (PCT) Patent Application No. PCT/US97/07773, mailed Apr. 15, 1998.

International Preliminary Examination Report for International (PCT) Patent Application No. PCT/US97/07773, mailed Sep. 16, 1998.

International Search Report for International (PCT) Patent Application No. PCT/US04/03488, mailed Sep. 13, 2004.

Written Opinion for International (PCT) Patent Application No. PCT/US04/03488, mailed Sep. 13, 2004.

International Preliminary Report on Patentability for International (PCT) Patent Application No. PCT/US04/03488, mailed Aug. 25, 2005.

International Search Report for International (PCT) Patent Application No. PCT/US06/06697, mailed Sep. 25, 2006.

Written Opinion for International (PCT) Patent Application No. PCT/US06/06697, mailed Sep. 25, 2006.

Extended European Search Report for International (PCT) Patent Application No. PCT/US06/27323, mailed Jul. 27, 2009.

Supplementary European Search Report for European Patent Application No. 97940915.8, completed Sep. 19, 2000.

International Preliminary Report on Patentability for International (PCT) Patent Application No. PCT/US2006/027323, mailed Jan. 31, 2008.

Official Action for European Patent Application No. 97940915.8, mailed Apr. 11, 2003.

Official Action for European Patent Application No. 97940915.8, mailed Oct. 21, 2004.

Decision to Refuse a European Patent Application for European Patent Application No. 97940915.8, mailed Jul. 11, 2005.

Supplementary European Search Report for European Patent Application No. 97926416.5, mailed Aug. 25, 2000.

English translation for Official Action for Japanese Patent Application No. 2006-503384, issued Oct. 21, 2008, 2 pages.

Official Action for U.S. Appl. No. 09/242,978, mailed Jun. 20, 2002.
Official Action for U.S. Appl. No. 10/615,642, mailed Aug. 26, 2004.
Official Action for U.S. Appl. No. 09/187,446, mailed Jun. 23, 2000.
Official Action for U.S. Appl. No. 09/187,446, mailed Jun. 6, 2000.
Official Action for U.S. Appl. No. 09/187,446, mailed Mar. 21, 2000.

Kuchinsky et al., "FotoFile: A Consumer Multimedia Organization and Retrieval System," Proceedings of the SIGCHI conference on Human factors in computing systems: the CHI is the limit, p. 496-503, May 15-20, 1999, Pittsburgh, Pennsylvania, United States.

Official Action for European Patent Application No. 06787260.6, mailed Sep. 22, 2010.

International Search Report prepared by the U.S. Patent and Trademark Office on Feb. 26, 2007, for International Application PCT/US06/27323.

Written Opinion prepared by the U.S. Patent and Trademark Office on Feb. 26, 2007, for International Application PCT/US06/27323.

Official Action for European Patent Application No. 06787260.6, dated Feb. 8, 2012.

Official Action for U.S. Appl. No. 11/816,959, mailed Mar. 28, 2012 6 pages restriction requirement.

* cited by examiner

Fig. 4

MANUALLY-ASSISTED AUTOMATED INDEXING OF IMAGES USING FACIAL RECOGNITION

TECHNICAL FIELD

The present invention relates to the automated indexing of photographs according to the persons represented within the photograph, using automated facial recognition with manual assistance

BACKGROUND

The use of facial recognition for the indexing of images is now well established in the prior art. An example of such prior art is given in U.S. Pat. No. 6,526,158 to Goldberg, and further exemplified in U.S. Pat. No. 6,819,783 to Goldberg, et al.

It should be noted, however, that fully automated facial recognition is imperfect, and characterized by two types of errors. In the first case are false-positive errors, in which faces from two different people are assigned as being from the same person. In the second case are false-negative errors, in which faces from the same person are assigned as being from two separate people. One can usually trade off one type of error for another—that is, it is generally possible to reduce false-negative errors by increasing false-positive errors, and, conversely, to reduce false-positive errors by increasing false-negative errors. It is possible to eliminate false-positive errors altogether by never assigning two faces as being from the same person, and it is similarly possible to eliminate false-negative errors by assigning all faces as being from the same person. These extreme cases are not of practical importance though, and in general, all methods of automated facial recognition will generally exist with both false-positive and false-negative errors.

To achieve the goal of a fully indexed collection of images, manual assistance is required. This manual assistance can be from a person who knows the actual identities of the people represented in the image collection, such as in the indexing of a private image collection. Alternatively, as might occur in event photography (e.g. with cruise imaging), the final stages of indexing might be assisted instead by an employee of the cruise imaging company.

The difficulty in such manual processing can be appreciated when considering the numbers of images that can be present within a collection. For example, on a week-long cruise of a ship with more than 3000 passengers, upwards of 25,000 images may be taken, comprising 60,000 or more faces (an average of 2-3 people per picture). The number of possible face-to-face matches can be then over 3 billion. Automated facial recognition is imperfect, and depending on whether more false-positive or more false-negatives are acceptable, the number of sets of faces that must be reviewed in order to establish a perfectly or near perfectly indexed set may be as many as tens of thousands, taking hundreds of hours of labor. Even a personal collection of small thousands of images can take a substantial amount of time, reducing the attraction of facial recognition in indexing of images.

The methods and compositions of the present invention are intended to overcome these and other deficiencies, as described in the embodiments below.

SUMMARY OF THE INVENTION

It is an object of the present invention to reduce the amount of time required to manually-assist automated indexing of images using facial recognition.

It is further an object of the present invention to reduce the number of manual comparisons required complete automated indexing of images using facial recognition.

It is also an object of the present invention to improve the accuracy of manually-assisted automated indexing of images using facial recognition.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for indexing face images in a collection of images according to the persons that are represented by the face images. The method may comprise automatically indexing the face images in the collection so as to create a multiplicity of sets of face images, wherein each set comprises face images that are determined to represent the same person, and wherein the sets comprise errors chosen from the group consisting of false-positive errors and false-negative errors. It may also comprise presenting to an operator a set, wherein the operator manually determines whether all of the face images in the set represent the same person and manually splitting a set representing more than one person into a multiplicity of sets, each of which consist of face images that represent a single person. It may further comprise displaying to the operator at least one face image from a first set and at least one face image from a second set, wherein the operator manually determines whether the first set and the second set comprise face images representing the same person; and manually merging the first set and the second set if the sets comprise face images representing the same person. At the conclusion of the method, the resulting sets of face images now contain no false-positive or false-negative errors.

The step of presenting may additionally comprise exhibiting to the operator a first source image from which a first selected face in the set was derived and a second source image from which a second selected face in the set was derived, wherein the first source image and the second source image assist the operator in manually determining whether the first face and the second face represent the same person. The step of displaying may additionally comprise exhibiting to the operator a first source image from which a first chosen face from the first set was derived and a second source image from which a second chosen face from the second set was derived, wherein the first source image and the second source image assist the operator in manually determining whether the first face and the second face represent the same person.

The step of presenting may comprise generating a thumbnail image of at least one face in the set, which can comprise determining the locations of the eyes within the image comprising the face, scaling the image so that the eyes are separated by a predetermined number of pixels, and cropping the image with respect to the eye locations.

The step of displaying may comprise generating a thumbnail image of at least one face from the first set and at least one face from the second set, which can comprise determining the locations of the eyes within the source image from which the face was derived, scaling the image so that the eyes are separated by a predetermined number of pixels, and cropping the image with respect to the eye locations.

The step of displaying may additionally comprise displaying to the operator one or more face images from a third set.

The method may additionally comprise a second automated indexing performed on the collection to which incremental images have been added, utilizing the resulting sets of face images, wherein each individual resulting set is a subset of the sets produced in the second automated indexing. Face images from the incremental images may be added to at most one of the resulting sets.

The present invention is further directed to removing false-positive associations between face images that have been automatically indexed from a collection of images into a set representative of a unique person. This method may comprise presenting to an operator the set of face images, manually selecting by the operator one or more face images that are false-positive associations to other face images within the set, and removing the selected face images from the set. The resulting set of face images may now contain no false-positive errors.

The face images may ordered by the time at which the images were captured. Also, the face images may be ordered by the similarity of the face images as determined by automated means.

The method may also comprise creating a new set from the face images that have been removed, wherein the new set of face images are representative of a second person.

The present invention is also directed to a system for indexing face images in a collection of images according to the persons that are represented by the face images. The system may comprise an automated indexer that associates face images into a multiplicity of sets, each set of which is determined to comprise face images representative of the same person, wherein the sets comprise errors chosen from the group consisting of false-positive errors and false-negative errors. The system will be run by an operator. The system may further comprise a splitting screen displaying face images from a first set, a selection tool allowing the operator to select one or more face images from the first set that are false-positive associations with other face images within the first set, and a splitting function allowing the operator to remove the selected face images from the first set. The system also may comprise a merging screen presenting face images from a second set and face images from a third set, wherein one or more face images from the second set has similarity to one or more face images from the third set by some criterion of the automated indexer, and a merging function allowing the operator to merge the face images from the third set with the second set/ The application by the operator of the splitting function to face images selected with the selecting tool on the splitting screen removes false-positive associations, and the application by the operator of the merging function to face images presented on the merging screen removes false-negative associations, so that the resulting indexed face images will not contain false-positive and false-negative associations.

The face images displayed in the splitting screen may be ordered by the time at which the images from which the face images were derived were captured. The face images displayed in the splitting screen may be ordered by the similarity of the face images as determined by the automated indexer. The face images displayed in the splitting screen may be a subset of the sources images from which the face images were derived. The splitting screen may further comprise one or more source images from which the face images were derived. The face images presented in the merging screen are a subset of the sources images from which the face images were derived.

BEST MODES FOR CARRYING OUT THE INVENTION

Terminology

A "photograph" means a physical representation of a person, such as might be printed by silver process, dye sublimation, or other process on a paper substrate.

An "image" of a person means a representation of a person, which can be electronic (e.g. a JPG file) or physical (e.g. a photograph).

A "person" is a person that is represented in an image. The plural of person is denoted as "persons" in this description.

A "face" is a representation of a person within an image.

A "collection" means a set of images.

An "operator" is the person performing manual assistance in the indexing of the images.

The term "matching" related to two faces means that the two faces are representations of the same person.

The term "non-matching" related to two faces means that the two faces are not representations of the same person.

An "association" is the identification, whether by automated or manual means, of two or more faces as being of the same person. An association is made by either "associating" or "assigning" faces.

A "false-positive association" is an association that is made between two faces that are not representative of the same person.

A "false-negative association" is the lack of an association between two faces that are representative of the same person.

A "set" is a group of faces that are associated with or assigned to one another.

An "index" is a grouping of faces within an image collection into sets.

It should be appreciated that the brief definitions above are for convenience only, and do not fully encompass the meanings of the terms as used in the specification below. Other meanings within the present invention will be discovered in the following discussion.

Overview

Figure 1:
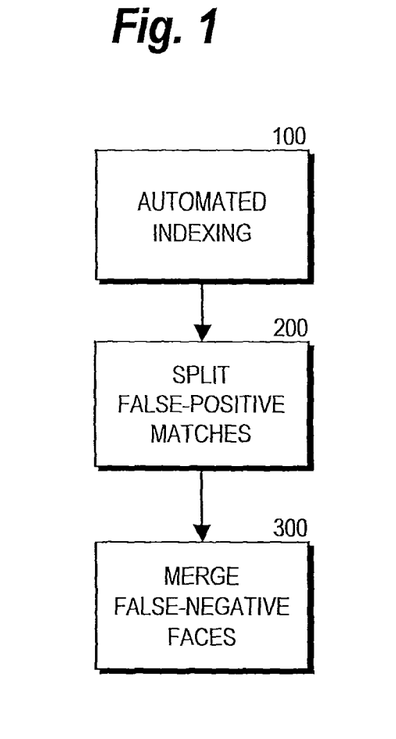
FIG. 1 is a process flow diagram of manually-assisted automated indexing of the present invention.

FIG. 1 is a process flow diagram of manually-assisted automated indexing of the present invention. In a first step 100 of automated indexing, a preliminary indexing of faces is performed in an automated fashion without direct human input into the matching of faces, forming an index of sets (i.e. faces that are associated with one another). In the step 100, locations of faces are extracted from images. These faces are then enrolled, so that the pixel values are expressed in a manner that allows for matching of faces. This enrollment may involve the use of frequency or time domain encoding, the use of principle components analysis, encoding of the face using neural network algorithms, or other such means. The faces so enrolled are then matched one to another, and a score indicating their similarity is derived. For purposes of this discussion, we will assume that a larger score indicates higher similarity, although the discussions below of the score would operate in reverse to the same effect if a lower score were to indicate higher similarity.

Given the scores, persons are then assembled into sets according to areas of higher similarity. In general, there are two methods of performing this step, although other methods are consistent with the present invention. In a first method, faces with very high scores are associated together as "seed" sets. Then, remaining faces with lower scores are then associated with sets, generally to the set comprising faces to which the remaining faces have their highest scores.

In a second method, the faces are stored in a "graph" (as known in the art of computer science) comprising faces at the nodes, and scores between two faces on the edges. In this case, lower score edges can be cropped, until faces that are associated with the same set are left.

There are numerous methods of automated indexing faces in addition to those above, and each of these have different successes depending on the methods employed, the quality of the images, and the distribution of people within the image collection. For example, a collection with a small number of persons (e.g. from a personal photo collection) will have, in general, different indexing errors associated with different methods than a collection with a large number of persons (e.g. from event imaging, such as cruise photography). All of these methods have errors which can benefit from the present invention.

In both of the methods above, there are criteria by which the system decides whether a face is a member of a set—that is, are representative of the same person. This criterion, generally speaking comprises one or more decisions thresholds, on one side of which the face is not associated with the person, and on the other side of which the face is deemed to be associated with the person.

It should be noted that the scores can include information in addition to the facial recognition scores, including such information as whether the faces come from the same image, come from images taken at nearly the same time, or come from images that have the same other persons. An example of such composite scores is given in U.S. Pat. No. 6,819,783 to Goldberg, et al.

Once the faces have been assembled into sets in the first step 100 in the fashion described above, or by other automated means, there now remain both false-positive and false-negative errors that should be eliminated. In overview, in the present invention we eliminate these errors in a two step procedure described below.

In a second step 200, images from one set at a time are presented to the operator. The operator "splits" from that set faces that are not representative of the same person. In this manner, false-positive matches are eliminated. This process is called "splitting". The faces that are split from a set can either be made into their own set, or alternatively, faces that are split from the set are allowed then to potentially automatically match with another set. For example, if a face could potentially match with two different sets (a first set and a second set), with a better match score with the first set, it will be generally placed with the first set according to the score criterion in the automated indexing step 100. If the face is then split from its original match with the first set in the splitting step 200, it can then potentially be associated automatically with the second set.

In a third step 300, sets that have some degree of similarity can be compared one with the other, for the operator to manually decided if the two different sets are representative of the same person. In this manner, false-negative errors are eliminated. The reason that the faces in the two sets were not previously associated into a single set could be that the degree of similarity was not high enough to allow for automated indexing. Alternatively, the faces in one set could have been associated with another set of higher similarity, from which they were separated in the step of splitting 200. If the operator deems the two sets as being representative of the same person, the faces from the two sets are combined into a single set. This process is called "merging".

The splitting step 200 and the merging step 300 will now be described in more detail.

Splitting 200

Figure 2A:
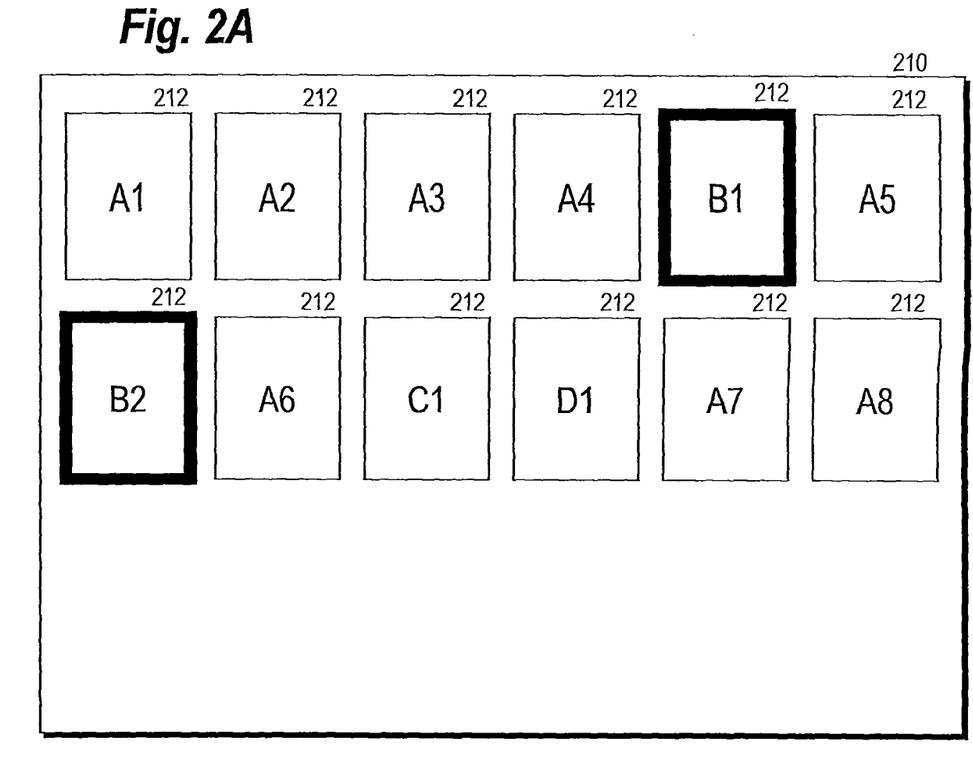
FIG. 2A is a schematic of a computer screen comprising a display of face thumbnails that can be used by an operator to perform splitting.

In the splitting step 200, faces that were improperly associated in the automated indexing into a set (i.e. false-positives) are manually split into different sets. FIG. 2A is a schematic of a computer screen 210 comprising face thumbnails that can be used by an operator to perform splitting 200. Each of the boxes 212 comprises an image of the specific face within the image from which the face was retrieved, and each of the faces has been associated by the automated indexing step 100 to being in the same set (i.e. they represent the same person). This set denoted the "current person" in the splitting step 200. Either every set from the automated indexing step 100 can be presented to the operator, or otherwise only those sets wherein the decision thresholds for the associations in the set were below some decision threshold (as described above), thereby being uncertain.

The faces can be placed on the screen as the entire image, in which the face is highlighted, for example by circling the face with a color that is well distinguished, by placing dots in the locations of the eyes of the face, by graying out or darkening the parts of the image that are not the face, or by other means that unambiguously indicate the face in the image that has been assigned to the current person.

A preferred method is to create a "thumbnail" image of the face. The initial phase of automated facial recognition is generally the finding of a face, which generally involves determining the location of the eyes of the face. Given the location of the eyes, an approximate rectangular region comprising the head can be computed. This region is preferably between 2 and 4 times the width of the distance between the eyes so measured, and preferably the eyes are between 50% and 75% of the distance from the bottom and the top of the thumbnail created. The thumbnails are constructed of the same size, and the faces are scaled to be of approximately the same within the thumbnails. The faces that are assigned to the current person are centered within the thumbnails. In the discussion below, the box 212 will be referred to as its preferred embodiment, thumbnail 212. In general, the generation of a thumbnail comprises locating the eyes, and then scaling and cropping the image so that the eyes are in the same location within the thumbnail image.

Because there is only one centered face within the thumbnail 212 (other faces will be towards the edges of the thumbnail), identifying the face in the image that was assigned to the current person is instantaneous, and the faces being of the same size are easier to compare.

In FIG. 2A, the identifiers within the thumbnails 212 denote the actual persons from which the faces in the thumbnails 212 were derived. For example, "A1" refers to the first face from the person "A", while "B2" refers to the second face from the person "B". In the example in FIG. 2A, the set being displayed comprises twelve faces from four different people ("A", "B", "C", and "D"). While the number of faces from person A is the largest, it is not necessary to consider the current person to be person A, but can alternatively be any of the persons whose faces have been assigned to the current person, and the others to be the false-positive assignments.

The operator now splits the faces that are from the same person from those that are not from the same person. The operator selects one or more thumbnails 212 using, for example, standards Windows operating system multi-selection techniques. In this mode, holding the Control keys would allow a set of thumbnails 212 to be toggled as being part of the selection. For example, in FIG. 2A, the thumbnails 212 B1 and B2 are selected, and the selection is indicated by a heavy border. Alternatively, dragging the cursor would select the thumbnails 212 within the area of drag. Clicking on one thumbnail 212, holding down the shift key, and then clicking on another thumbnail 212 would allow selection of all the thumbnails 212 that were clicked, as well as all intervening thumbnails 212. A second operator action, such as pressing the "S" key (for split), clicking the middle button, pulling down a menu and selecting "split" or right clicking and then choosing "split" from a secondary menu, or other operator action, would cause the selected faces to be split from the current person. Preferably, the split faces would be assigned to being from another person, retaining their association with each other, as will be described below.

The splitting 200 process can be performed on the same set of faces in a variety of different orders. In the example of FIG. 2A, the faces A1-A8 can be split, and then the faces B1-B2, and then face C1, leaving only face D1 as being part of the current set. Alternatively, the faces B1-B2 can be split, and then the face C1 and then the face D1, leaving the eight faces A1-A8 as being from the same set. Alternatively, the faces B1-B2, C1 and D1 can be split at the same time, creating a new set with faces from the three persons ("B", "C", and "D"), which would then be split one from the other in a subsequent step.

The order of the faces presented to the operator, and well as their manner of presentation, can facilitate the step of splitting 200. For example, it should be appreciated that the steps of indexing can be performed multiple times on the same collection, For example, in the case of event imaging on cruise ships, the indexing will be performed on each day of the cruise, as new images are added to the collection. Faces that are associated with one another through manually-assisted automated indexing of the present invention can go through the splitting step 200 as new faces are associated with a person. If the faces that had previously been indexed together are presented consecutively in the screen 210, this will speed the process of selecting new faces that have been falsely associated with the current person, so that the false-positively associated faces can be most easily split. Furthermore, marking the faces that had previously been manually associated with one another, for example with a colored dot or border, informs the operator which faces should not be split one from the other. It should be appreciated that one can otherwise mark those faces that have not been previously associated, so as to focus the operator's attention on those faces.

Another preferred ordering of faces is to sort the faces according to the similarity of the faces as determined by some automated means. For example, the scores between the faces can be used by a clustering algorithm (for example, K-means or hierarchical clustering), and then arranged so that the faces that are most closely related will be near to one another. This arrangement is of particular value when a large number of faces are indexed at once, without a prior indexing, and presented to the operator. When comparing and selecting individual faces to split, being in proximity on the screen 210 facilitates the operations.

The thumbnails 212 remove some of the context from the images, such as the other persons in the images, that can be useful in determining whether the faces in two different thumbnails 212 are associated with one another. To facilitate the manual indexing, it is convenient to allow the retrieval of the full image by some operator action, such as double-clicking on a thumbnail 212, or by right-clicking followed by selection from a secondary menu. Indeed, it is most preferable for the operator to be able to select two different thumbnails 212 from which full images 214 are retrieved, so that the context from both of the images (e.g. the other persons in the images) can be best compared.

Figure 2B:
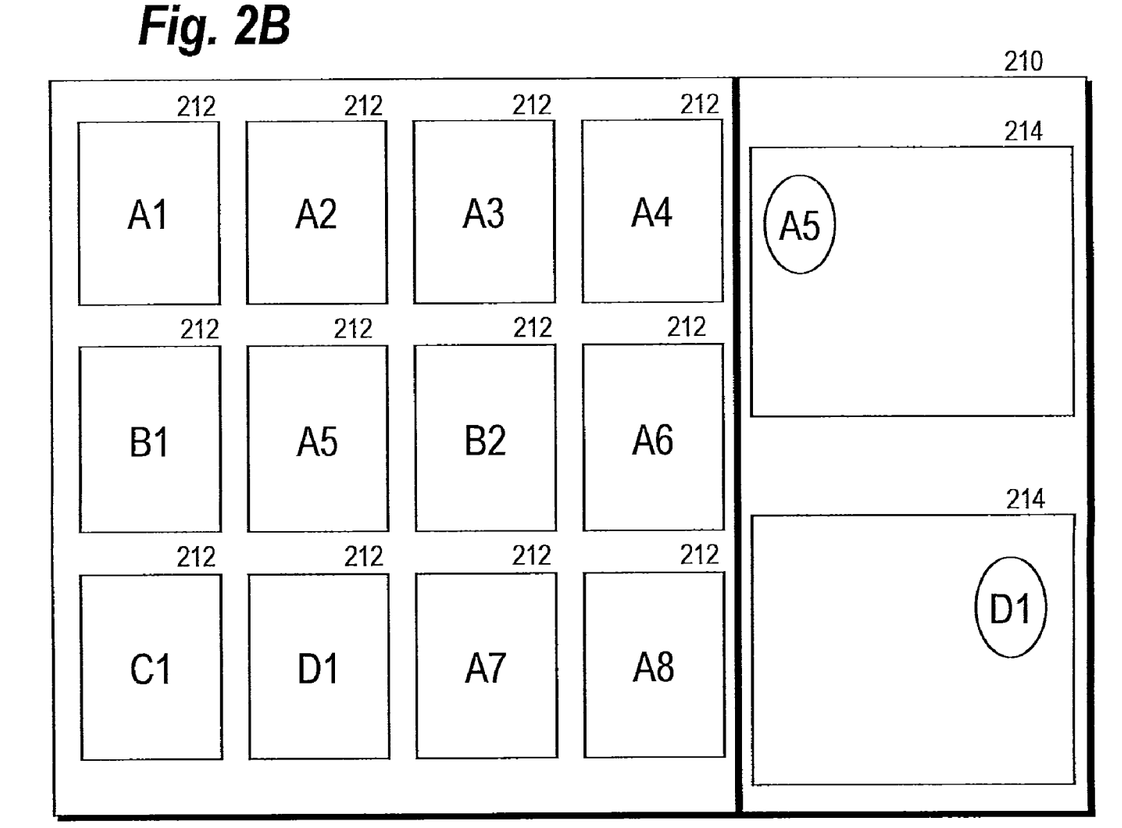
FIG. 2B is a schematic of a computer screen that can be used by an operator to perform splitting, as in FIG. 2A, further comprising full source images of the faces for a subset of the face thumbnails.

FIG. 2B is a schematic of a computer screen 210 that can be used by an operator to perform splitting 200, as in FIG. 2A, further comprising full source images 214 from which a subset of the face thumbnails 212 were derived. In this case, the screen is split vertically into a left and right region, in which the left region comprises an array of thumbnails 212 similar to that shown in FIG. 2A. The right region comprises an area for two full images 214, from which faces in the left region were derived (in this case A5 and D1). This right region more easily allows the operator to determine whether faces AS and D1 (denoted by ellipses) are from the same person. It is preferable for those thumbnails 212 corresponding to the source images 214 to be marked in such a way that the correspondence is evident to the operator. For example, a red dot can be placed in the thumbnail 212 corresponding to the upper source image, which also has a red dot, whereas a blue dot can be place in the thumbnail corresponding to the upper source image, which also has a blue dot, allowing the operator to easily match the thumbnail 212 with its source image 214.

It should be noted that on splitting one or more faces from the current person set, that face can either be considered to be now a new person set comprised of the split faces, or alternatively, the faces can now be associated with another set. For example, in the automated indexing, a face (or group of faces) can have a high similarity to both a primary set and a secondary set, with a higher similarity according to the primary set. The automated system can assign the faces to one set, but should this association be determined by manual indexing to have been made in error, the similarity to the secondary set can be high enough so that during the manual splitting process 200, the operator will be given the secondary set to review. This secondary set is now associated with the faces split from the primary set, and the operator can determine if the association was correctly made.

At the conclusion of this step of splitting 200, there should be no false-positive associations of faces within any set. However, there can be false-negative associations, in which faces from the same person are not associated with one another, but with different sets.

Merging 300

Figure 3:
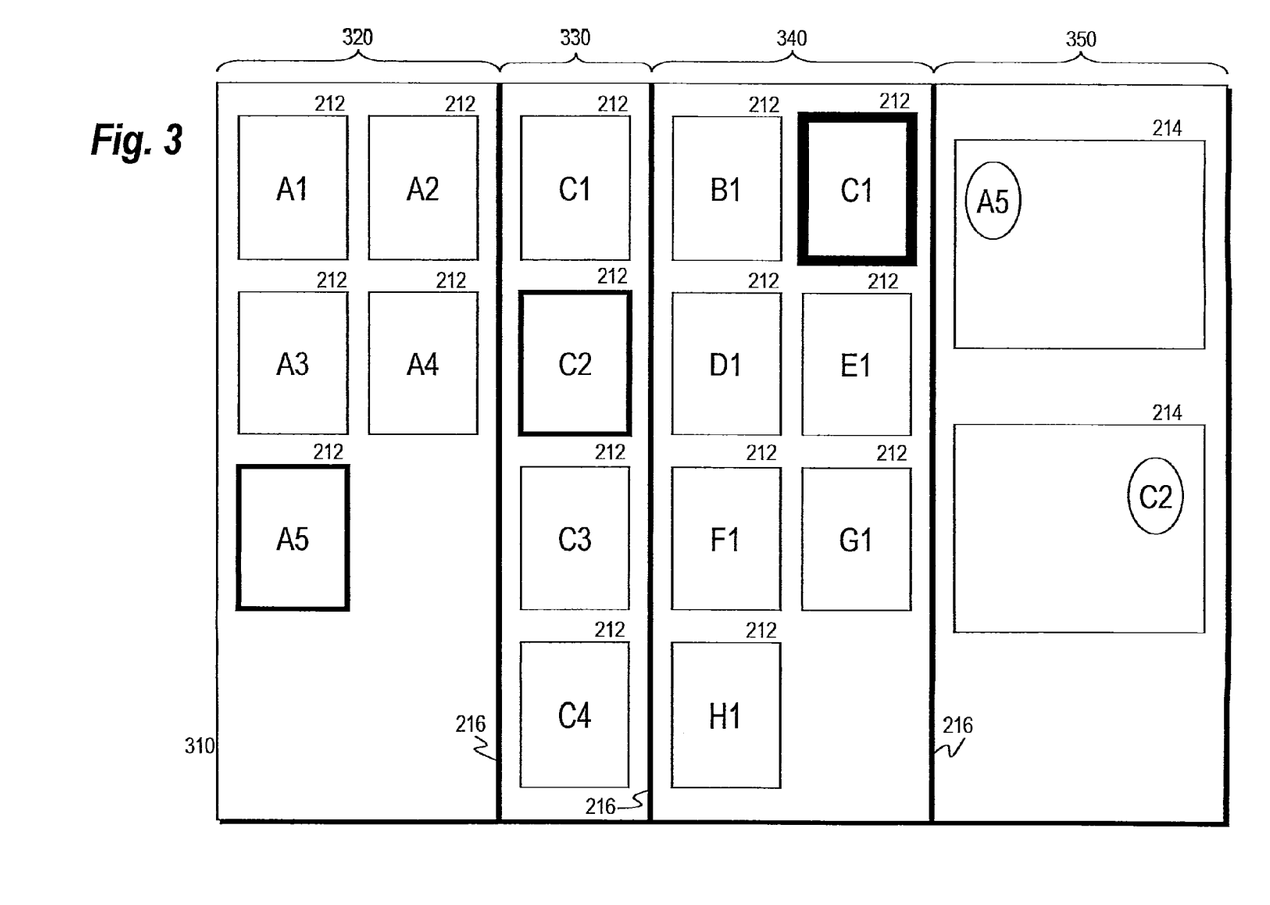
FIG. 3 is a schematic of a computer screen comprising face thumbnails that can be used by an operator to perform merging.

FIG. 3 is a schematic of a computer screen 310 comprising face thumbnails 212 that can be used by an operator to perform merging 300. In merging 300, the screen 310 is divided by vertical bars 216 into regions. A current person region 320 comprises a number of thumbnails 212 of the current person.

The current person corresponds to the set for whom the operator is searching for other persons comprising faces that have incorrectly been assigned as being not representative of the current person (i.e. this is a false-negative association).

A similar persons region 340 comprises a number of thumbnails 212 of faces that are representative of sets that are potentially representative of the current person. In FIG. 3, there is a single thumbnail 212 for each similar person set, though it can also be convenient to have multiple thumbnails 212 from each set of a similar person. For example, the region 340 can alternatively comprise rows (or columns) of thumbnails 212 in which each row (or column) would comprise thumbnails 212 from the same set, allowing the operator to scan many faces in both the current person set as well as the similar person sets.

The operator can select one of the persons from the similar persons by selecting the corresponding thumbnail, which is then indicated by a heavy border. This person is then considered the candidate person. In FIG. 3, the candidate person is "C1", indicated by the heavy border.

The candidate person region 330 comprises a number of thumbnails of faces from the candidate person selected in the similar persons region. As the selected person is C1, the thumbnails displayed in the candidate person region 330 are faces taken from that person's set, and are designated here C1 through C4 (and can continue through scrolling to a larger number of faces).

The concurrent visibility of multiple faces from the current person set (A1 through A5) and the candidate person set (C1 through C4) allows the operator to very efficiently compare the current person to the candidate person to decide whether they should be merged into the current person. In order to further assist the operator, the images from which certain thumbnails 212 were derived can be displayed in a source image region 350 to the far right. In this case, the operator has selected the current person thumbnail 212 A5 and the candidate person thumbnail 212 C2, and the source images 214 for these thumbnails 212 are shown in the source image region 350.

It is convenient to order the sets in the similar persons region according to the similarity of each similar person set to the current person set, so that the similar persons most likely to match the current persons should be in the top row of the region 340. It can also be convenient to similarly order the individual thumbnails 212 in the candidate person region 330 so that the faces from the candidate set that are most similar to the faces in the current person set are the first faces that are displayed in the region 330.

It is preferable for each of the regions 320, 330 and 340 be made to scroll vertically, so that if there are more thumbnails 212 than can fit at one time on the screen, the operator can scroll down to see more of the thumbnails 212.

It should be noted that both the current person and the similar person sets should have had false-positive associations removed by means of the step of splitting 200 prior to this merging step 200. While it is possible to index faces by first merging 300 and then splitting 200, it can be confusing to the operator. Consider the operator encountering a current person set and a similar person set in the merging 300 screen 310, wherein both of the person sets comprise false-positives, of which there are some faces in both sets representative of the same person, and others that are not representative (e.g. the current person set is comprised of faces A1, A2, A3 and B1, while the similar person set comprises faces A4, A5, A6 and C1). It would be unclear to the operator whether the two sets should be merged, since this would also introduce new false-positive associations to the merged set (i.e. the B1 and C1 with the A faces).

Splitting and Merging of Multiple Sets Simultaneously

The methods above are optimally arranged for splitting and merging individual current sets. Given a large collection, especially taken for event imaging—such as for a cruise or a theme park—the number of sets can be very large. Furthermore, the collection may need to be indexed multiple times in an incremental fashion as new images are collected. The burden on the operator can be very large, as he must visually inspect large numbers of sets to determine whether there are either false-positive or false-negative errors.

Figure 4:
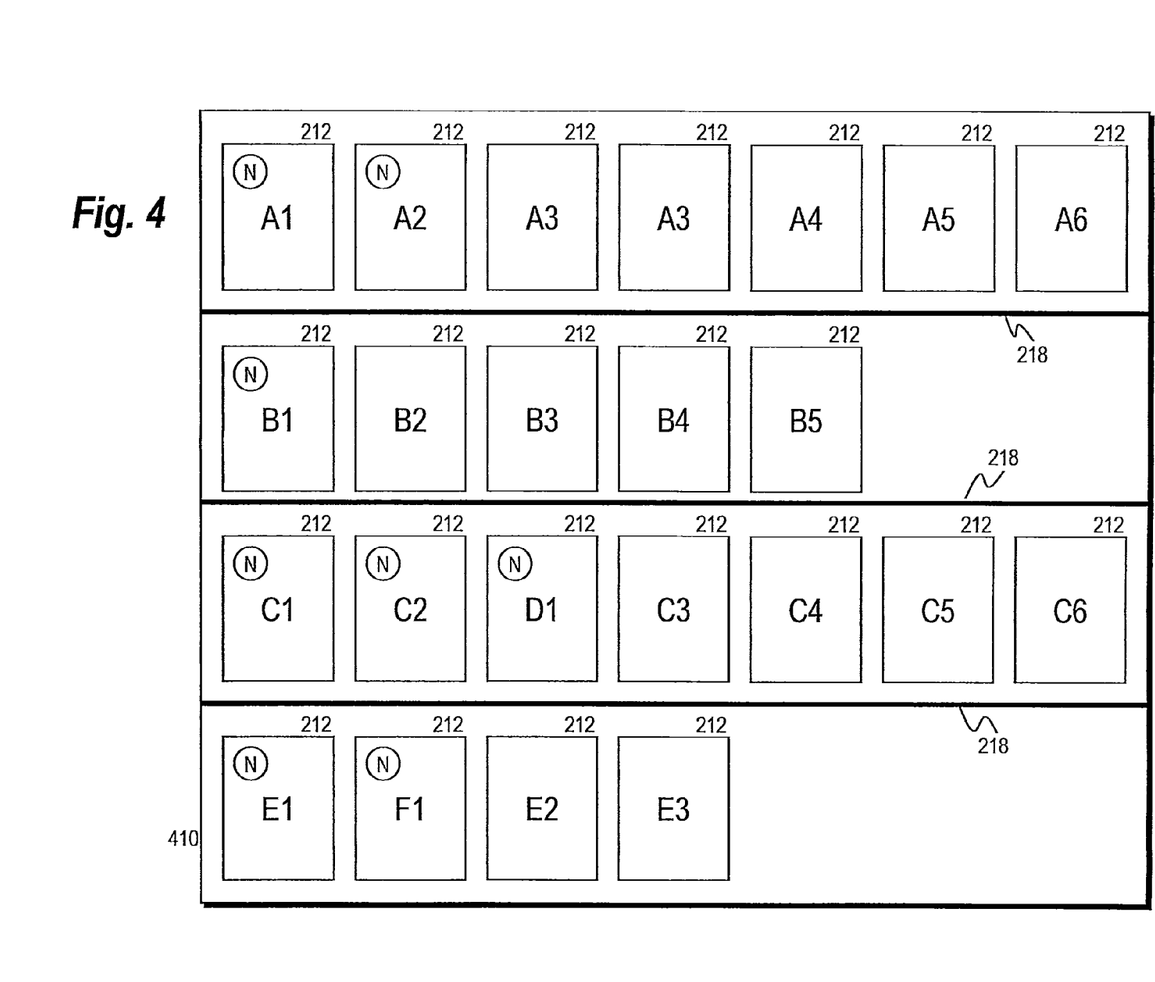
FIG. 4 is a schematic of a computer screen comprising rows of sets of faces that can be used by an operator to rapidly perform splitting or merging on a number of sets at one time.

In order to accommodate these instances, the operator can inspect many sets at one time. This is illustrated in FIG. 4, which is a schematic of a computer screen 410 comprising rows of sets of faces that can be used by an operator to rapidly perform splitting or merging on a number of sets at one time. The screen 410 is split by a number of horizontal separators 218, wherein each row comprises face thumbnails 212 either from the same set (as in the splitting screen 210), or alternatively faces from two sets that are deemed by automated means (e.g. facial recognition scores) to have a high similarity (as in the merging screen 310).

The face thumbnails for each row are divided into two groups, each group indicated by some easily distinguished visual mark. In the example given in FIG. 4, the thumbnails 212 to the left are distinguished by the letter N in a circle that is filled with a bright color. There are many other marks that can be conveniently used, including different colored borders, separating the left and the right thumbnails 212 with a line, or other means. The thumbnails to the right will generally come from a single set that has been previously gone through the split step 200, and therefore contains no false-positive associations.

The thumbnails on the left comprise presumptive faces for association. These presumptive faces can be from a set that has a high similarity to the set on the right, and be presented for merging. Alternatively, if there are images and faces that are being added incrementally to a fully and accurately indexed collection, the thumbnails 212 to the left can comprise "new" faces that have been added automatically to the set through the automated indexing step 100. The letter designation "N" refers to the fact that these faces are "new" to the collection.

The operator can then go through the rows and assign each row to one of four different actions:
1) Allow the set to remain "as is"—in this case, all of the faces on the left are determined to match with the faces on the right, and therefore the set "as is" contains no false-positive associations and should be kept with its current composition.
2) Perform a "split"—in this case, all of the faces on the left are determined not to match with the faces on the right, but that they do match each other. In this case, the faces on the left are split into their own set.
3) Perform an "explode"—in this case, all of the faces on the left are determined not to match with the faces on the right, and furthermore, they are not associated with one another. In this case, the faces on the left are split into a number of individual sets comprising each a single face.
4) Reserve for closer manual inspection—in this case, it is either not possible to determine whether the faces on the left match with the faces on the right, or there is a complex relationship that does not allow either a split or explode (e.g. there are three faces on the left, with two matching one another and not the third face). These sets are presented to the user generally in a screen for splitting as in FIG. 2A or FIG. 2B.

With a screen such as this, the operator can examine multiple sets at one time.

Incremental Addition of Faces

As mentioned above, in many cases the images will be added incrementally over a period of time. In these cases, the operator will index the collection according to the present invention, resulting in no false-positive or false-negative associations. Then, new images with new faces will be added to the collection. In such cases, there are means to ensure that the maximum amount of prior information is used in the indexing process to minimize subsequent effort and to provide maximum accuracy.

Firstly, it is generally useful in split display 210 (and also screen 410) to indicate those faces that have been previously been determined to be from the same person. That is, if we are looking at a set of 10 faces, of which 8 were previously indexed correctly, and 2 are "new" faces, by indicating which are the new faces and which are the previously indexed, the operator knows not to examine the previously indexed faces, as they can be presumed to be correct. The labeling can be of the new faces (e.g. as with the "N" in the circle of FIG. 4), of the previously indexed faces, or of both (i.e. mutually distinguishable marks).

Additionally, the automated indexing step 100 should have the information from the previous indexing so as to retain the identity of the sets previously established. That is, no two sets from a previous indexing should be merged together (as all false-negative associations had previously been addressed), and no set from a previous indexing should be split among or into two sets (as all false-positive associations had previously been addressed). That is, each set in a prior indexing according to the present invention should be a subset of a set in the next step of automated indexing. One way to ensure this is to arrange so that automated indexing with incremental images simply adds faces within the incremental images to the prior sets, except in cases where matches with faces in previous faces cannot be established, in which case new sets are formed.

Furthermore, the operator should only be given decisions to make related to the new faces, and no sets should be presented to the operator that have no new faces.

Many Embodiments within the Spirit of the Present Invention

It should be apparent to one skilled in the art that the above-mentioned embodiments are merely illustrations of a few of the many possible specific embodiments of the present invention. It should also be appreciated that the methods of the present invention provide a nearly uncountable number of arrangements of indicators, tags, detectors, mixing means, force application means and more.

Numerous and varied other arrangements can be readily devised by those skilled in the art without departing from the spirit and scope of the invention. Moreover, all statements herein reciting principles, aspects and embodiments of the present invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

It should be further appreciated that the definitions in the section "Terminology" are not limiting, but rather reflect a brief description of the terms for the benefit of the reader. Typically, such terms should be read with reference to the prior art and conventional use of the terms. Broader meanings of the terms are provided either directly or indirectly in the more lengthy discussion that follows that section.

It should be noted that while the identification means described above comprises facial recognition, it is also possible to use other means for determining the identities of the patrons in images. Also, it should be noted that location, sizes, orientations (e.g. horizontal boundaries between layers versus vertical) and shapes of the regions of the screens 210 and 310 (e.g. the full image regions, or the current person regions) can be varied without changing the fundamental operations of the present invention. Furthermore, since all automated facial recognition engines have some number of errors (either false-positive and/or false-negative errors), the methods of the present invention will serve to allow for manual reduction of those errors. Similarly, the algorithms for associating faces with one another into persons will have errors, which can similarly be reduced.

In the specification hereof any element expressed as a means for performing a specified function is intended to encompass any way of performing that function. The invention as defined by such specification resides in the fact that the functionalities provided by the various recited means are combined and brought together in the manner which the specification calls for. Applicant thus regards any means which can provide those functionalities as equivalent as those shown herein.

What is claimed is:

1. A method for indexing face images in a collection of images according to the persons that are represented by the face images, comprising:
   automatically indexing, by a computer processor, the face images in the collection so as to create a multiplicity of sets of face images, wherein each set comprises face images that are determined to represent the same person, and wherein the sets comprise errors chosen from the group consisting of false-positive errors and false-negative errors;
   presenting to an operator by a display, a set, wherein the operator manually determines whether all of the face images in the set represent the same person;
   manually splitting a set representing more than one person into a multiplicity of sets, each of which consist of face images that represent a single person;
   displaying to the operator by a display at least one face image from a first set and at least one face image from a second set, wherein the operator manually determines whether the first set and the second set comprise face images representing the same person; and
   manually merging the first set and the second set if the sets comprise face images representing the same person;
   wherein the resulting sets of face images now contain no false-positive or false negative errors.

2. The method of claim 1 wherein presenting additionally comprises exhibiting to the operator, by a display, a first source image from which a first selected face in the set was derived and a second source image from which a second selected face in the set was derived, wherein the first source image and the second source image assist the operator in manually determining whether the first face and the second face represent the same person.

3. The method of claim 1 wherein displaying additionally comprises exhibiting to the operator by a display a first source image from which a first chosen face from the first set was derived and a second source image from which a second chosen face from the second set was derived, wherein the first source image and the second source image assist the operator in manually determining whether the first face and the second face represent the same person.

4. The method of claim 1 wherein presenting comprises generating by a computer processor a thumbnail image of at least one face in the set.

5. The method of claim 4 wherein generating for each face comprises determining with the assistance of a computer processor the locations of the eyes within the image comprising the face, scaling by a computer processor the image so that the eyes are separated by a predetermined number of pixels, and cropping by a computer processor the image with respect to the eye locations.

6. The method of claim 1 wherein displaying comprises generating a thumbnail image on a display of at least one face from the first set and at least one face from the second set.

7. The method of claim 6 wherein generating for each face comprises determining with the assistance of a computer processor the locations of the eyes within the source image from which the face was derived, scaling by a computer processor the image so that the eyes are separated by a predetermined number of pixels, and cropping by a computer processor the image with respect to the eye locations.

8. The method of claim 1 wherein displaying additionally comprises displaying on a display to the operator one or more face images from a third set.

9. The method of claim 1 additionally comprising a second automated indexing performed by a computer processor on the collection to which incremental images have been added, utilizing the resulting sets of face images, wherein each individual resulting set is a subset of the sets produced in the second automated indexing.

10. The method of claim 9 wherein face images from the incremental images are added to at most one of the resulting sets.

11. A method for removing false-positive associations between face images that have been automatically indexed from a collection of images into a set representative of a unique person, comprising:
presenting to an operator by a display the set of face images;
manually splitting a set representing more than one person into a multiplicity of sets, each of which consist of face images that represent a single person;
assigning, by a computer processor, an association between the split images;
displaying to the operator by a display images from a first set;
manually selecting by the operator one or more face images from the first set that are false-positive associations to other face images within the first set;
removing by a computer processor the selected face images from the first set;
wherein the resulting set of face images now contain no false-positive errors.

12. The method of claim 11 wherein the face images are ordered by the time at which the images were captured.

13. The method of claim 11 wherein the face images are ordered by the similarity of the face images as determined by automated processor means.

14. The method of claim 11 additionally comprising creating by a computer processor a new set from the face images that have been removed, wherein the new set of face images are representative of a second person.

15. A system for indexing face images in a collection of images according to the persons that are represented by the face images, comprising:
an automated indexer that associates face images into a multiplicity of sets, each set of which is determined to comprise face images representative of the same person, wherein the sets comprise errors chosen from the group consisting of false-positive errors and false negative errors;
an operator;
a splitting screen displaying face images from a first set;
a selection tool allowing the operator to select one or more face images from the first set that are false-positive associations with other face images within the first set;
a splitting function allowing the operator to remove the selected face images from the first set;
a merging screen presenting face images from a second set and face images from a third set, wherein one or more face images from the second set has similarity to one or more face images from the third set by some criterion of the automated indexer; and
a merging function allowing the operator to merge the face images from the third set with the second set;
wherein the application by the operator of the splitting function to face images selected with the selecting tool on the splitting screen removes false-positive associations, and the application by the operator of the merging function to face images presented on the merging screen removes false-negative associations, so that the resulting indexed face images will not contain false-positive and false-negative associations.

16. The system of claim 15 wherein the face images displayed in the splitting screen are ordered by the time at which the images from which the face images were derived were captured.

17. The system of claim 15 wherein the face images displayed in the splitting screen are ordered by the similarity of the face images as determined by the automated indexer.

18. The system of claim 15 wherein the face images displayed in the splitting screen are a subset of the sources images from which the face images were derived.

19. The system of claim 18 wherein the splitting screen further comprises one or more source images from which the face images were derived.

20. The system of claim 15 wherein the face images presented in the merging screen are a subset of the sources images from which the face images were derived.

21. The method of claim 11, further comprising:
displaying to the operator by a display images from a second set;
manually selecting by the operator one or more face images from the second set that are false-positive associations to other face images within the second set;
removing by a computer processor the selected face images from the second set;
wherein the resulting second set of face images now contain no false-positive errors.

22. The method of claim 21, further comprising manually merging the first set and the second set if the sets comprise face images representing the same person.

* * * * *